US007720668B2

(12) United States Patent
Al-Hamwy et al.

(10) Patent No.: US 7,720,668 B2
(45) Date of Patent: May 18, 2010

(54) SYSTEM AND METHOD FOR SCHEDULING TOKEN ARRIVAL IN A BUSINESS PROCESS SIMULATION

(75) Inventors: Tammam Al-Hamwy, Markham (CA); Jay W. Benayon, Thornhill (CA); Pablo D. Irassar, Markham (CA); Vincent Szaloky, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 11/531,809

(22) Filed: Sep. 14, 2006

(65) Prior Publication Data

US 2008/0126036 A1    May 29, 2008

(51) Int. Cl.
*G06F 9/45* (2006.01)
(52) U.S. Cl. .............................. 703/22; 703/6
(58) Field of Classification Search ............... 703/22, 703/6
See application file for complete search history.

(56) References Cited

U.S. PATENT DOCUMENTS

| 2003/0233273 | A1 | 12/2003 | Jin et al. | |
|---|---|---|---|---|
| 2004/0034857 | A1 | 2/2004 | Mangino et al. | |
| 2004/0230404 | A1 | 11/2004 | Messmer et al. | |
| 2005/0233750 | A1* | 10/2005 | Pirrone | 455/446 |
| 2006/0190310 | A1* | 8/2006 | Gudla et al. | 705/7 |
| 2008/0126024 | A1* | 5/2008 | Gottsman | 703/2 |

OTHER PUBLICATIONS

Naval Research Laboratory, "The Multi-Generator (MGEN) Version 4.2", downloaded from the Internet Archive Wayback Machine for http://pf.itd.nrl.navy.mil/mgen/mgen.html, dated Jun. 22, 2006, pp. 1-45.*
Naval Research Laboratory, "MGEN-3.2 User's Guide", downloaded from the Internet Archive Wayback Machine for http://pf.itd.nrl.navy.mil/mgen/mgen3/MgenUserGuide.html, dated Sep. 24, 2005, pp. 1-15.*
Parag C. Pendharkar, "A computational study on the performance of artificial neural networks under changing structural design and data distribution", 2002, European Journal of Operational Research, vol. 138, pp. 155-177.*
Lianjun An et al., "On developing system dynamics model for business process simulation", 2005, Proceedings of the 2005 Winter Simulation Conference, pp. 2068-2077.*
Stanley Greenberg, "GPSS Primer", 1972, John Wiley & Sons, pp. 151-164.*

* cited by examiner

*Primary Examiner*—Paul L Rodriguez
*Assistant Examiner*—Russ Guill
(74) *Attorney, Agent, or Firm*—Cantor Colburn LLP; Joseph Bracken

(57) ABSTRACT

A business process simulation system for scheduling token arrival in a business process simulation is provided. The system includes a frequency module for receiving user input defining a frequency of token arrival; a duration module for receiving user input defining at least one repeatable valid duration of availability to receive tokens; an exemption module for receiving user input defining an exemption duration within the availability duration; and a timer module for receiving user input defining a recurring timer calendar for the business process simulation. The system also includes a token scheduling controller, wherein the token scheduling controller is adapted to process instructions corresponding to the user inputs and sending token scheduling instructions corresponding to the user-defined parameters to the business process simulation.

11 Claims, 4 Drawing Sheets

SYSTEM AND METHOD FOR SCHEDULING TOKEN ARRIVAL IN A BUSINESS PROCESS SIMULATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to business process modeling and simulation, and particularly to scheduling token arrival in the business process modeling and simulation.

2. Description of the Related Art

In Business Process Modeling, simulation plays a vital role in evaluating and comparing the different alternatives prior to deploying those processes in a runtime environment. For a business to base its decisions on business process simulation, it is crucial that the business process simulation engine provide realistic information and benchmarks.

Process simulations may be used to observe a process in action, to examine the statistics that it generates as it runs, and to perform analysis on the simulation results. Changes to a process or to other model elements (such as available resources) may also be simulated and quantified with a comparative analysis of the before and after simulation result.

Simulation enables organizations to observe how a process will perform in response to variations of inputs to the process, just as in a real-life work environment. Simulation also provides the ability to vary process input volume over time by adjusting resources and current allocations. Simulation output provides detailed information regarding resource utilization levels and the results of cost and cycle-time calculations.

Within a simulation, a token represents a unit of work that is received by a process and transferred between different activities in the process flow. By specifying token creation settings, the quantity and rate of inputs that the process handles in a simulation run are defined.

For a process simulation to run, the process must receive one or more inputs. In a simulation profile, inputs to the process and to activities within the process are represented by tokens. Some tokens represent the transfer of data between activities, while other tokens represent only a transfer of control.

Token creation settings for any input that is associated with data, whether it is an input to a process or an input to an activity, within a process may be defined. The rate at which tokens are created for an input are determined by setting a time trigger. The time trigger can be a regular interval, or it may be a variable interval defined by a distribution.

The number of tokens to generate at one time (number of tokens per bundle), and a one time cost per token may also be defined. In addition, each of these attributes can be set to a constant value or to a variable value defined as a distribution may also be defined.

For example, to create tokens that represent the arrival of customers at a restaurant, one could use a normal distribution to specify an arrival interval, where five minutes is the mean and three minutes is the standard deviation. A weighted distribution list could be used for the number of tokens per bundle, to represent how many customers are in each party. In this example, the weighted distribution list enables setting of probabilities for each size of party, based on past experience.

By default, the token creation settings for a process in a simulation profile are set to the values specified in the local simulation preferences, except for the total number of tokens to generate. This value is instead derived from the minimum number of inputs as specified in the process model. This is done to prevent a situation in which the process cannot start because it does not receive the minimum number of inputs (which could be the case if the token creation settings in the local simulation preferences are a lesser value than the minimum number). You can also customize the token creation settings by changing them from their default values in the simulation profile.

Business process simulation engines in the marketplace base their token arrivals on a simple timetable where the user specifies the start time, end time, and number of tokens. In this way, the burden is put on the end-user to explicitly specify a table of constant point-in-times and associate each point-in-time with a constant number of tokens. Effectively, the end-user would have to fill a table like the one shown in Table 1.

TABLE 1

| Start Time | End Time |
|---|---|
| Apr. 28, 2005 @ 1200 AM | Apr. 28, 2005 @ 0600 AM |
| Point-In-Time | Number of Tokens |
| Apr. 28, 2005 @ 12:00 AM | 10 |
| Apr. 28, 2005 @ 01:23 AM | 7 |
| Apr. 28, 2005 @ 4:51 AM | 12 |

However, it will be appreciated that many realistic business simulations require that token arrivals are based on a recurring time calendar with each recurring time interval—potentially—having a distinct distribution. Therefore a need exists for a token scheduler operating with a recurring time calendar.

SUMMARY OF THE INVENTION

The shortcomings of the prior art are overcome and additional advantages are provided through the provision of a system and method to schedule token arrival in a business process engine based on a recurring time calendar. Token and token bundles arriving within these recurring time intervals can either be specified as a constant or defined by a distribution. Additionally, the rate of token arrival can either be implicitly specified by a more granular recurring calendar (for example a calendar that defines a time interval recurring every minute) or can be specified by a constant time or defined by a distribution.

In accordance with one embodiment of the present invention a business process simulation system for scheduling token arrival in a business process simulation is provided. The system includes a frequency module for receiving user input defining a frequency of token arrival; a duration module for receiving user input defining at least one repeatable valid duration of availability to receive tokens; an exemption module for receiving user input defining an exemption duration within the availability duration; and a timer module for receiving user input defining a recurring timer calendar for the business process simulation. The system also includes token scheduling controller, wherein the token scheduling controller is adapted to process instructions corresponding to the user inputs from the frequency module, the duration module, the exemption module and the timer module.

The invention is also directed towards a method for scheduling token arrival in a business process simulation. The method includes entering a user-defined parameter for a frequency of token arrival; entering a user-defined parameter for at least one repeatable user-defined duration of the business process simulation availability; entering a user-defined parameter for a recurring timer calendar; and entering a user-defined parameter for an exemption duration within the availability duration. The method also includes sending token scheduling instructions corresponding to the user-defined parameters to the business process simulation.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which improves business process simulation modeling with enhanced token scheduling capability.

A program storage device readable by a machine, tangibly embodying a program of instructions executable by the machine to perform a method for scheduling token arrival in a business process simulation is provided. The method includes entering a user-defined parameter for a frequency of token arrival and entering a user-defined parameter for a repeatable user-defined duration of the business process simulation availability. The method also includes entering a user-defined parameter for a recurring timer calendar and entering a user-defined parameter for exemption duration within the availability duration specified by the recurring timer calendar. The method continues with entering a user-defined parameter for a maximum allowable number of tokens to be scheduled for arrival. The method also allows for entering a user-defined parameter for an offset time for token arrival from the beginning of the availability duration and selecting a user-defined parameter for a user-defined distribution of the frequency of token arrival. Selecting the user-defined parameter for the user-defined distribution of the frequency of token arrival further includes selecting user-defined distribution from the group consisting of a normal model, a Poisson model, a Gaussian model, a growth model, a sigmoidal model, and an exponential model. In addition, the method also accounts for sending token scheduling instructions corresponding to the user inputs to the business process simulation.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
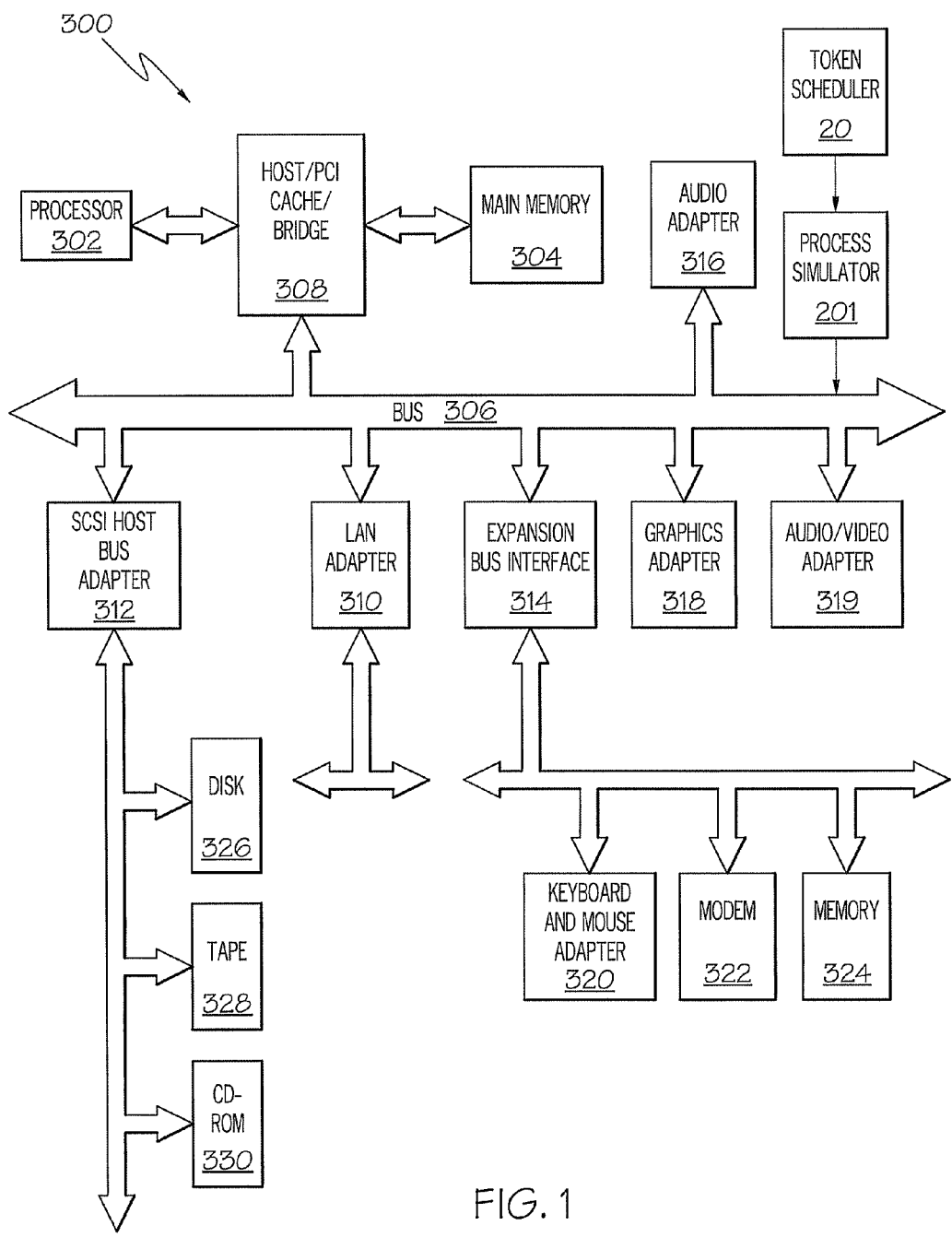
FIG. 1 is an exemplary diagram of a business process simulation system in accordance with a preferred embodiment of the present invention.

With reference now to FIG. 1, a block diagram illustrating a business process simulation system 300 is depicted in which the present invention may be implemented. Business process simulation system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support PCI expansion slots or add-in connectors.

Figure 3:
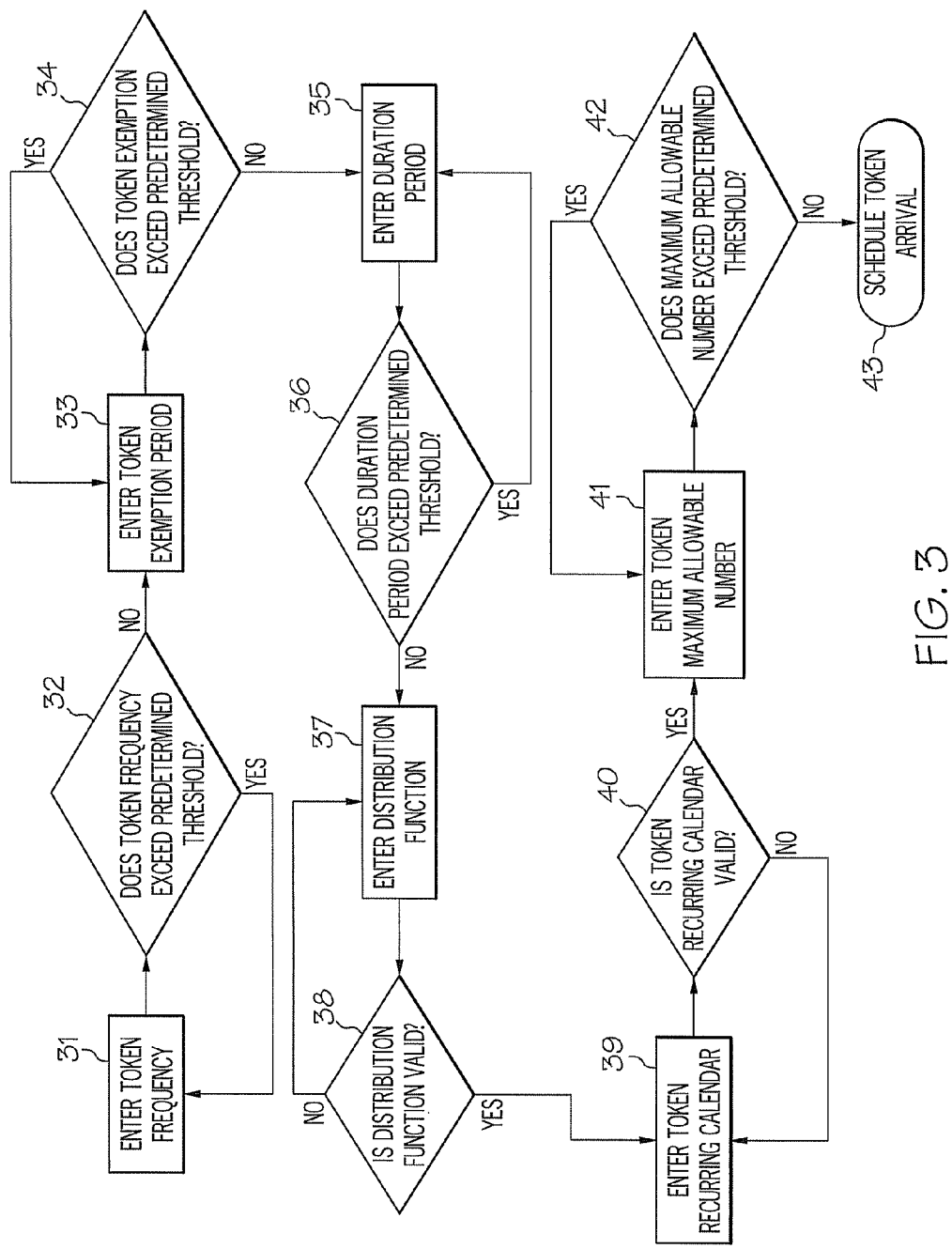
FIG. 3 is flowchart illustrating one method of the token scheduler feature shown in FIG. 2.

An operating system runs on processor 302 and is used to coordinate and provide control of various components within data processing system 300 in FIG. 3. The operating system may be a commercially available operating system, such as AIX, which is available from IBM Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Token scheduler 20 receives user input via keyboard and/or mouse adapter 320. Inputs to token scheduler 20 define offset durations, period durations, distributions, token frequency, exemption durations, maximum number of tokens allowed, and a recurring calendar input. The token scheduler inputs are described in detail herein. It will be appreciated that token scheduler 20 may receive inputs via any suitable method. For example, inputs may be predetermined and stored in memory 324, or stored on disk 326, for later retrieval.

Process simulator 201 receives token scheduling information from token scheduler 20. It will be appreciated that process simulator 201 may be any suitable process simulator such as IBM's WEBSPHERE™ process simulator.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1.

The depicted example in FIG. 1 and above-described examples are not meant to imply architectural limitations. For example, business process simulation system 300 also may be a notebook computer or hand held computer in addition to taking the form of a PDA.

Figure 2:
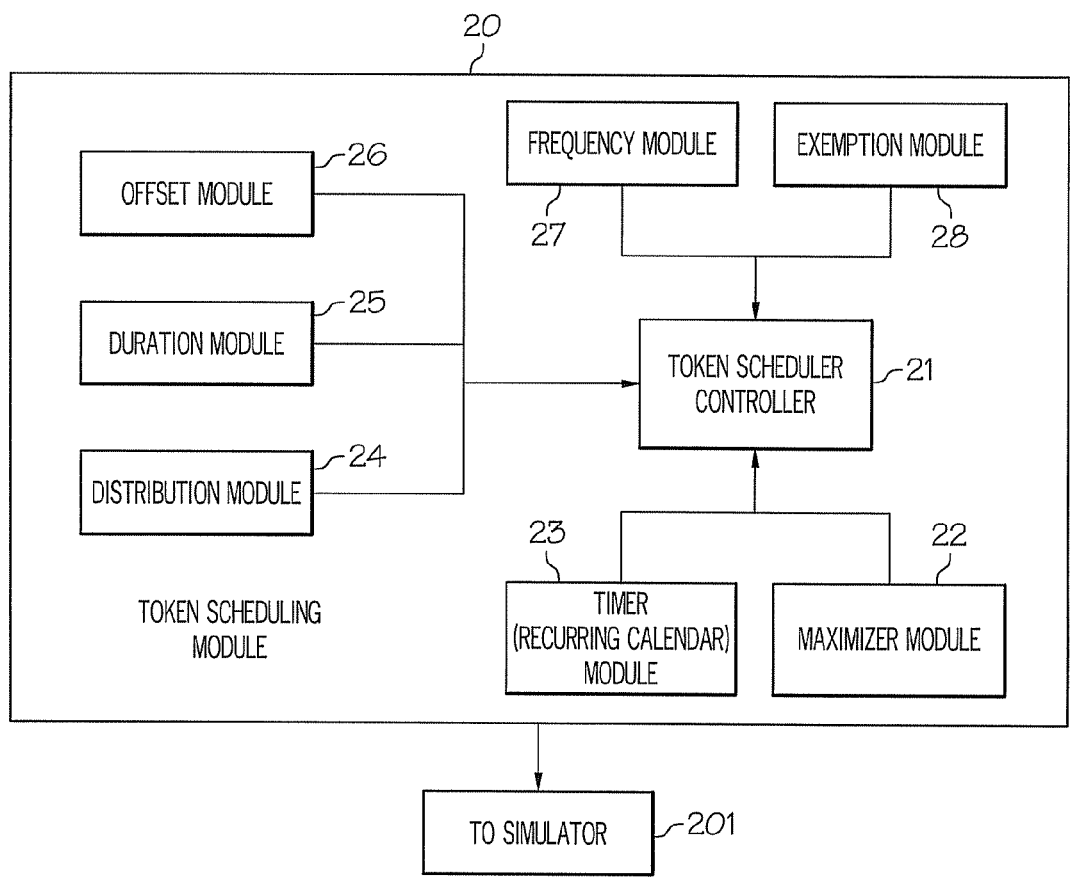
FIG. 2 is an exemplary diagram of the token scheduler features in business process simulation in accordance with the present invention shown in FIG. 1.

Turning now to FIG. 2 there is shown an exemplary diagram of the token scheduler features in business process simulation in accordance with an embodiment of the present invention as shown in FIG. 1. Frequency module 27 receives user input defining a frequency of token arrival and provides a token frequency component to token scheduler controller 21. Duration module 25 receives user input defining repeatable duration and provides a duration component for system availability to receive tokens to token scheduler controller 21. Exemption module 28 receives user input defining exemption duration within the system availability and provides an exemption component to token scheduler controller 21. Offset module 26 receives user input defining an offset period and provides an offset component to token scheduler controller 21. Timer module 23 receives user input defining a recurring timer calendar and provides a timer component to token scheduler controller 21. Maximizer module 22 receives user input defining a maximum allowable number of token arrivals in the availability duration and provides a maximizer component to token scheduler 21. Distribution module 24 receives user input defining token arrivals based on a user-defined time distribution or portion of a user-defined time distribution and provides a distribution component to token scheduler controller 21. Token scheduler module 21 contains logic and resources necessary for processing instructions from the components corresponding to the user inputs and providing to simulator 201 a calendar based token arrival schedule in accordance with embodiments of the present invention. As noted earlier, simulator 201 may be any suitable business process simulator such as IBM's WEBSPHERE™ business simulator.

Turning now to FIG. 3, and also still referring to FIG. 1, there is shown a flowchart illustrating one method of the token scheduler feature shown in FIG. 2. A token frequency is entered 31 by user via keyboard or mouse 320. The entered token frequency is compared 32 to a predetermined threshold. If the predetermined threshold is exceeded the user is alerted and control is passed back to user. If the predetermined threshold is not exceeded the user enters 33 a token exemption period. The token exemption period is also compared 34 to a predetermined threshold. If the predetermined exemption threshold is not exceeded the user enters 35 a duration period. The duration period is compared 36 to a predetermined duration period. If the predetermined duration period is not exceeded the user enters 37 a distribution function describing token arrival over the allowed arrival duration. It will be appreciated that the distribution function may be any suitable distribution function such as, for example, a normal distribution, a Laplacian distribution, or a Poisson distribution. It will also be appreciated that the distribution function may be entered 37 by a user or pre-stored in any suitable media such as memory 324 or CD ROM 330. If the distribution function is determined 38 as valid the user enters 39 a recurring calendar period. The recurring calendar period may be any suitable recurring calendar period as described herein. If the recurring calendar period is determined 40 to be valid the user enters 41 the maximum number of tokens allowed to be received during a duration period. If the maximum number of tokens allowed to be received does not exceed a predetermined threshold 42 the token(s) arrival is scheduled 43 by simulator (FIG. 1, 201).

Figure 4:
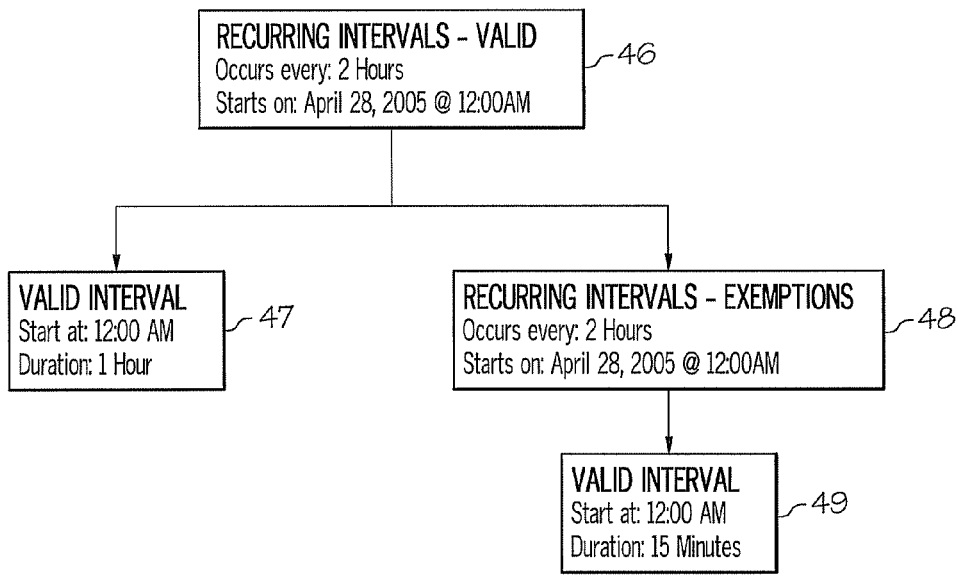
FIG. 4 is a pictorial diagram of an example of the token interval features shown in FIG. 3.

FIG. 4 is a pictorial diagram of an example of the token interval features shown in FIG. 3. In this example a calendar recurring duration recurs every two hours 45, lasts for an hour 47, the first fifteen minutes of which is exempt 49.

Figure 5:
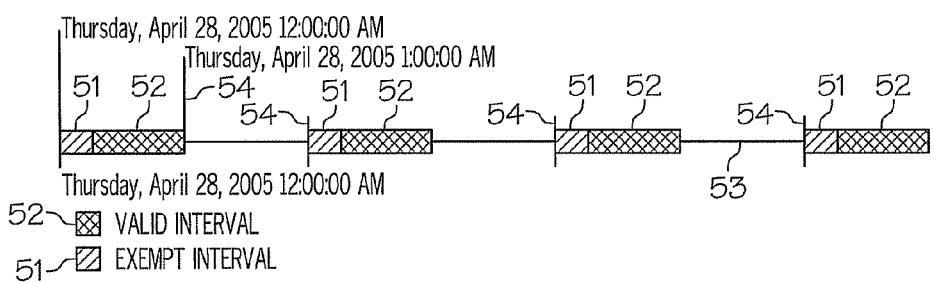
FIG. 5 is a graphical representation of the exemption interval features shown in FIG. 4.

Turning now to FIG. 5, there is shown a graphical representation of the exemption interval features shown in FIG. 4. A recurring time calendar and is defined as a time calendar 53 that would contain one or more valid intervals (which could potentially be a point-in-time—i.e. have a zero duration) and optionally a recurring exemption time calendar. For example, if a business process necessitates that tokens be scheduled to arrive every other hour as shown by vertical lines 54, but discount the first fifteen minutes of the recurring intervals as shown by hatched areas 51. Effectively, a business process engine taking this timeline 53 as input when scheduling token arrivals would only allow tokens to arrive within the solidly-shaded (valid interval) areas 52 shown in FIG. 5.

It will be appreciated that in an embodiment of the present invention the feature of calendar-based token arrival solution allows the end-user to only have to define a recurring calendar and associate the number of token bundles to schedule for arrival—which could either be constant or a specification of a mathematical distribution (e.g. a uniform distribution with a specified minimum and maximum or a normal distribution with a specified mean and standard deviation, etc. . . . ).

For example, a user modeling token arrival on a call center would first define a time calendar with recurring time intervals that define token arrival everyday between 8:00 AM and 5:00 PM with an exemption interval from 12:00 PM to 1:00 PM in between—say for lunch. The end-user can then specify token arrivals in one of three ways, provided in Examples 1, 2 and 3:

Example 1

Based on an offset time from the beginning of the recurring interval. Referring to Table 2, it is seen that the time is not absolute, (i.e., it's an offset from the start of the interval), and the user has a choice to either specify the number of tokens as a constant or as a mathematical distribution that best fit the business model under examination.

TABLE 2

| Offset Duration | Number of Tokens | |
|---|---|---|
| | Constant | Distribution |
| 15 Minutes | 10 | Normal |
| 2 Hours | 7 | Poisson (8) |
| 6 Hours & 2 Minutes | 12 | Uniform |

Example 2

Based on number of tokens and rate of arrival. Referring to Table 3, in the first interval, the spread of token arrival is evenly distributed within the specified interval. If the user selects a total of four (4) tokens to arrive, the rate of arrival would be one per hour starting at 8:00 AM.

TABLE 3

| Time Interval | Number of Tokens | | |
| --- | --- | --- | --- |
| | Constant | Distribution | Spread |
| 8:00AM~ | 4 | Normal | Evenly |
| 2 Hours | 7 | Poisson (8) | Based on Offset |

Alternatively, the user may choose to specify a non-even distribution in which case the user will specify the spread using the above table 3 for that particular time interval.

Example 3

Based on a point-in-time recurring time calendar—it will be appreciated that this a benefit from the use of recurring timer calendars. Using this alternative, the user would model a recurring time calendar with zero duration for each time interval. These recurring point-in-times are then associated with a constant value specifying the total number of tokens to schedule for arrival or optionally an appropriate mathematical distribution.

Figure 6:
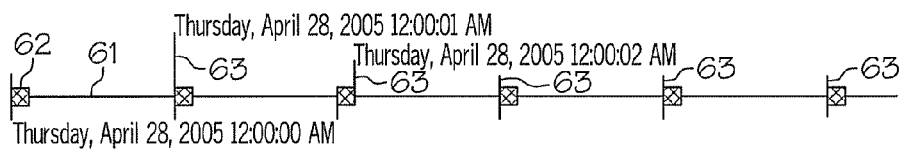
FIG. 6 is a graphical representation of valid token arrivals in accordance with the present invention shown in FIG. 1 and FIG. 2.

For example, referring to FIG. 6, defining a recurring time interval 62 that recurs every second as shown by the vertical lines 63 in FIG. 6 would effectively define the rate of arrival and the timeline 61 would appear as shown. Using this alternative the end-user advantageously need not specify a rate of arrival as the rate is implicitly defined by this recurring point-in-time calendar. Thus, the user would specify the token creation as shown in Table 4.

TABLE 4

| Time Interval | Number of Tokens | | |
| --- | --- | --- | --- |
| | Constant | Distribution | Spread |
| 8:00AM~ | 4 | Normal | Based on Calendar |
| 1:00PM~ | 7 | Poisson (8) | Based on Calendar |

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A business process simulation system for scheduling token arrival in a business process simulation, the system comprising: a processor;
   a frequency module configured to receive user input defining a frequency of token arrival;
   a duration module configured to receive user input defining at least one repeatable valid duration of availability to receive tokens;
   an exemption module configured to receive user input defining an exemption duration within the availability duration;
   a timer module configured to receive user input defining a recurring timer calendar for the business process simulation;
   an offset module configured to receive user input defining token arrivals based on an offset time from the beginning of the availability duration;
   a maximizer module configured to receive user input defining a maximum allowable number of token arrivals in an availability duration;
   a distribution module configured to receive user input defining token arrivals based on a user-defined time distribution model; and
   a token scheduling controller, wherein the token scheduling controller is adapted to process instructions corresponding to the user inputs from the frequency module, the duration module, the exemption module, the timer module, the offset module, the maximizer module, and the distribution module.

2. The system as in claim 1 wherein the distribution model comprises a model selected from the group consisting of a normal model, a Poisson model, a Gaussian model, a growth model, a sigmoidal model, and an exponential model.

3. The system as in claim 1 further comprising a business process simulator.

4. The system as in claim 1 further comprising a user input device.

5. The system as in 1 further comprising at least one electronic storage media.

6. A method for scheduling token arrival in a business process simulation, the method comprising:
   at a token scheduler, entering a user-defined parameter for a frequency of token arrival;
   at the token scheduler, entering a user-defined parameter for at least one repeatable user-defined duration of the business process simulation availability;
   at the token scheduler, entering a user-defined parameter for a recurring timer calendar;
   at the token scheduler, entering a user-defined parameter for an exemption duration within the availability duration;
   at the token scheduler, entering a user-defined parameter for a maximum allowable number of tokens to be scheduled for arrival;
   at the token scheduler, entering a user-defined parameter for an offset time for token arrival from the beginning of the availability duration; and
   at the token scheduler, selecting a user-defined parameter for a user-defined distribution of the frequency of token arrival; and
   at a process simulator, receiving token scheduling instructions corresponding to the frequency of token arrival, the at least one repeatable user-defined duration, the user-defined parameter for the recurring timer calendar, the user defined parameter for the exemption duration, the user-defined parameter for a maximum allowable number of tokens, the user-defined parameter for an offset time for token arrival, and the user-defined parameter for a user-defined distribution of the frequency of token arrival.

7. The method as in claim 6, wherein selecting the user-defined parameter for the user-defined distribution of the frequency of token arrival further comprises selecting the user-defined parameter for the user-defined distribution from a pre-stored memory location.

8. The method as in claim 7, wherein selecting the user-defined parameter for the user-defined distribution of the frequency of token arrival further comprises defining the user-defined distribution as a Poisson distribution.

9. The method as in claim 7, wherein selecting the user-defined parameter for the user-defined distribution of the frequency of token arrival further comprises defining the user-defined distribution as a normal distribution.

10. The method as in claim 7, wherein selecting the user-defined parameter for the user-defined distribution of the frequency of token arrival further comprises defining the user-defined distribution as a Laplacian distribution.

11. A program storage device readable by a machine, tangibly embodying a program of instructions executable by the machine to perform a method for scheduling token arrival in a business process simulation, the method comprising:

entering a user-defined parameter for a frequency of token arrival;

entering a user-defined parameter for at least one repeatable user-defined duration of the business process simulation availability;

entering a user-defined parameter for a recurring timer calendar;

entering a user-defined parameter for an exemption duration within the availability duration;

entering a user-defined parameter for a maximum allowable number of tokens to be scheduled for arrival;

entering a user-defined parameter for an offset time for token arrival from the beginning of the availability duration;

selecting a user-defined parameter for a user-defined distribution of the frequency of token arrival, wherein selecting the user-defined parameter for the user-defined distribution of the frequency of token arrival further comprises:

selecting user-defined distribution from the group consisting of a normal model, a Poisson model, a Gaussian model, a growth model, a sigmoidal model, and an exponential model; and sending token scheduling instructions corresponding to the frequency of token arrival, the at least one repeatable user-defined duration, the user-defined parameter for the recurring timer calendar, the user defined parameter for the maximum allowable number of tokens to be scheduled for arrival, and the user defined parameter for the exemption duration, to the business process simulation.

* * * * *